United States Patent [19]

Ort

[11] 4,322,707
[45] Mar. 30, 1982

[54] STRAIN GAGE TRANSDUCER WITH A FOIL STRAIN GAGE ARRANGEMENT SECURED TO A SPRING

[75] Inventor: Werner Ort, Darmstadt, Fed. Rep. of Germany

[73] Assignee: Hottinger Baldwin Measurements, Inc., Framingham, Mass.

[21] Appl. No.: 139,159

[22] Filed: Apr. 4, 1980

[30] Foreign Application Priority Data

Apr. 23, 1979 [DE] Fed. Rep. of Germany ....... 2916427

[51] Int. Cl.³ .............................................. G01L 1/22
[52] U.S. Cl. .................................. 338/2; 29/610 SG; 73/862.65
[58] Field of Search ......................................... 338/2–6, 338/42, 47, 195; 29/610 SG, 592; 73/141 A, 862.65; 156/651, 654, 656

[56] References Cited

U.S. PATENT DOCUMENTS

| | | | |
|---|---|---|---|
| 4,021,766 | 5/1977 | Aine | 338/4 X |
| 4,050,049 | 9/1977 | Youmans | 338/47 |
| 4,144,516 | 3/1979 | Aine | 338/2 |
| 4,185,496 | 1/1980 | Tisone et al. | 73/141 A |

*Primary Examiner*—C. L. Albritton
*Attorney, Agent, or Firm*—W. G. Fasse; D. F. Gould

[57] ABSTRACT

A strain gage transducer, preferably of the above double bending spring or beam type, has secured to its spring or springs strain gage elements etched out of foil from which further conductor configurations have been simultaneously etched. These further conductor configurations are shunted by interruptable short circuits. Some of these configurations have such a shape that they are substantially nonsensitive to strain and hence located in a zone or zones of the spring or beam where the deformation due to strain is relatively small, for example in a central zone. Others of these configurations have a shape to exhibit large creeping. The latter shapes and the respective strain gage elements are secured to the spring or springs substantially in zones of large deformation. By interrupting the proper short circuits the negative creeping of the foil strain gage compensates the positive creeping of the respective spring.

10 Claims, 3 Drawing Figures

STRAIN GAGE TRANSDUCER WITH A FOIL STRAIN GAGE ARRANGEMENT SECURED TO A SPRING

BACKGROUND OF THE INVENTION

The invention relates to a strain gage transducer with a foil strain gage arrangement secured to a spring. Such transducers include at least one foil strain gage and the respective terminals.

Such transducers are well known in the art. Reference is made, for example, to the "Handbook of Scale Making" by Reimpell-Bachmann, Volume 3, 1966, page 34. The foil strain gage arrangement in this context may comprise a single foil strain gage, or a half bridge, or a full bridge. It is further known from "Home Grown Strain Gage Transducers", by Dorsey, 1976, pages 11 to 13 and page 25, to provide the foil strain gage arrangements for such transducers with adjustable resistances. These resistances or impedances are made of different materials and thus permit the compensation of the temperature characteristic of the null signal as well as of the usuable signal. Further, these resistors permit the null adjustment as well as the calibration of the transducer. The different impedances are short circuited by low resistance conductors which are interruptable. Thus, by interrupting the short circuit conductors, it is possible to electrically include into the bridge circuit the respectively required resistances. However, in this manner only a rather limited number of parameters are adjustable. Further parameters as for example, the creeping or sensing errors due to torsion cannot be compensated according to the prior art. Besides, in this type of prior art arrangement it is not possible to influence the individual foil strain gages.

German Patent Publication No. (DE-OS) 2,831,590 discloses layer or film resistances comprising a main resistor element and additional elements which are short circuited through respective low resistance, interruptable conductor elements. The main resistor elements and the additional elements are connected in series and the resistance value of the additional elements is provided in binary steps. The film resistors are adjusted in such a manner that the conductor sections are interrupted at the required locations, whereby at least portions of the additional resistor elements become effective. By means of this prior art teaching it is possible to quickly adjust film or layered resistors to a desired resistor value with sufficient accuracy and by means of a few interruptions in the conductor element.

In connection with the manufacturing of transducers or pick-ups, so-called creeping is a special problem. Creeping is defined as the change of the transducer output signal as a function of time while maintaining a uniform load on the transducer. Thus, reference is made to FIG. 1 to illustrate the causes of creeping. FIG. 1 shows the expansion of a spring as a function of time and also the strain measured by a foil strain gage applied to the spring as a function of time. At the point of time $t_0$ the spring and thus the foil strain gage shall be loaded with a load represented by a stepped function. Corresponding to the loading the spring and the applied foil strain gage expands by a certain amount $S_o$ as shown in FIG. 1. As time passes, the expansion of the spring increases although the load remains constant. This is referred to as "positive creeping". At the same time the grid of the foil strain gage contracts which is referred to as "negative creeping". Such constriction is basically due to the non-ideal elastic characteristic of the synthetic resin adhesive which is used for securing the foil strain gage to the spring.

The positive creeping of the spring depends on the spring material and on the shape and the size of the spring. The negative creeping of the foil strain gage depends primarily on the number and configuration of the direction reversing zones of the foil strain gage. Thus, it is possible to, for example, substantially reduce the negative creeping of the foil strain gage by increasing the size of the direction reversing zones of the foil strain gage to form so-called "dead-ends". If the absolute value of the negative creeping of the foil strain gage corresponds exactly to the absolute value of the positive creeping of the spring then the two effects compensate each other. However, the creeping is a very complex phenomenon which so far has not been completely determined theoretically and in a quantitive manner. Thus, heretofore it was necessary to provide for each new spring a new strain gage arrangement for compensating the positive creeping of the spring. This is so even if the new spring has a known shape and is merely larger or smaller than a previous spring.

For this purpose a foil strain gage arrangement is especially suitable for which the creeping may be varied as is known, for example, from German Patent Publication No. (DE-PS) 2,049,820. This prior art arrangement comprises at least one foil strain gage with a meandering electrical conductor extending across the direction of strain or expansion. The electrical conductor additionally comprises direction reversing zones in such a manner that the creeping of a defined portion of the foil strain gage compensates the creeping of the other portions of the measuring device, whereby electrical taps are provided at several points of the conductor. In the device according to German Patent Publication No. 2,049,820 the proportion of the creeping compensating grid direction reversing zones and grid ends may be varied by a respective connection of the taps. Stated differently, the foil strain gage arrangement may be adapted to the creeping characteristics of the pick-up or transducer.

However, in such an arrangement it is disadvantageous that the characteristics of the foil strain gage such as the impedance and the sensitivity are varied with the switching-on of additional conductor direction reversing zones. Thus, even after the correct creeping proportion has been switched-on, so to speak, further substantial compensating steps must be taken on the transducer in order to obtain data which are comparable to those initially measured.

OBJECTS OF THE INVENTION

In view of the above it is the aim of the invention to achieve the following objects singly or in combination:

to provide a transducer or pick-up which permits a simple and time saving adjustment of different influences, particularly the creeping, the torsion, and the temperature influences;

to provide an adjustment for the above characteristics without causing variations of the impedance or of the sensitivity of the foil strain gage arrangement; to provide a foil strain gage arrangement which will permit very fine corrections for the above undesired influences;

to tune or adjust a foil strain gage transducer to a desired sensitivity;

to adjust the negative creeping of the foil strain gage arrangement to such an extent that it compensates the positive creeping of the spring;

to eliminate the temperature dependency of the creeping:

to compensate a foil strain gage arrangement transducer for off-center load applications;

to provide a foil strain gage arrangement which may be used for different types of springs;

to compensate for sensitivity differences which may result due to production tolerances; and to provide foil strain gage arrangements which will have a predetermined impedance.

SUMMARY OF THE INVENTION

According to the invention there is provided a foil strain gage etched from a piece of foil which is simultaneously provided, also by etching with further configurations which have, after securing the foil strain gage to the transducer spring, different mechanical, electrical characteristics. These configurations of the foil strain gage and the further configuration are initially short circuited by low resistance, interruptable conductor sections. Due to this type of arrangement of the foil strain gages with the respective configurations, the foil strain gage arrangement applied to the transducer may be subjected to a simple testing program in which it can be ascertained which conductor sections need to be interrupted for the adjustment of the above mentioned influences.

According to an advantageous embodiment electrical taps are provided between the configurations and the conductor sections, whereby the conductor sections may be interrupted between the electrical taps. In this manner especially very fine corrections are possible. Such an arrangement in which one further configuration forms a part of at least one foil strain gage, permits the adjustment of the arrangement to a desired sensitivity. If at least one further configuration is dimensioned or shaped for strong creeping, the creeping of the foil strain gage arrangement can be adjusted until the creeping of the foil strain gage arrrangement is negatively equal to the positive creeping of the spring, whereby the two effects compensate each other.

A configuration shaped for compensating particularly strong creeping is especially practical if the configuration or shape meanders in the direction of the strain or spring expansion. This type of configuration has the advantage that it has a low resistance or impedance while simultaneously exhibiting very high creeping.

As mentioned above, further complications are caused by the fact that the creeping depends on the temperature. It has been found, that this characteristic can be influenced by the geometric shaping of the configuration subject to strong creeping. Thus, it is advantageous to use configurations having different temperature characteristics with regard to their creeping. For example, configurations are possible having portions with an increasing creeping in response to temperature and other portions with a decreasing creeping in response to temperature and these portions can be electrically interconnected in a suitable manner.

If further configurations which are relatively insensitive to strains are applied to spring zones which expand but a little, one may consider these configurations as a resistor which makes possible an adjustment of the total impedance of the foil strain gage arrangement, stated differently, such resistor permits an adjustment of the zero point of the transducer.

An arrangement for compensating an off-center load application is also possible, whereby the error occurring due to the fact that the spring is subjected to torque by the off-center load application, is compensated. This type of arrangement comprises at least one further configuration extending at an angle of about 45° relative to at least one foil strain gage. This further, slanted configuration, forms a further foil strain gage.

It has been found to be especially advantageous to place the position of the taps in a foil strain gage arrangement between configurations and interruptable conductor sections in such a manner that the quantities of the mechanical, electrical characteristics of the configurations are arranged in binary steps between two adjacent taps. In this manner the compensation may be made quickly and simultaneously with a sufficient accuracy.

An especially advantageous transducer or pick-up comprising a double bending spring and a force application about centrally in the double bending spring is characterized in that the foil strain gage arrangement constitutes two half bridges which are applied to the upper and the lower bending spring in such a manner that the foil strain gages and the conductor configurations shaped for strong creeping are located at the ends of the springs, whereas the conductor configurations shaped for being substantially nonsensitive to strain are arranged about centrally on the bending springs. Such a transducer or pick-up produces on the one hand a large signal which is substantially free of errors due to the full bridge circuit arrangement and the double bending spring. Thus, this last signal may be adjusted in a wide range within the measuring accuracy in such a manner that the creeping does not have any influence on the signal over a wide temperature range and that the torsional error also does not influence the signal. On the other hand, the transducer or pick-up may thus be calibrated and has a predetermined input and output impedance without the need for separate series resistors nor for any shunt resistors. This type of calibration is especially advantageous in those instances where the temperature dependency of the pick-up signal which is caused by the temperature dependency of the modulus of elasticity of the steel of which the transducer spring is made, is eliminated by a compensating temperature dependency of the impedance strain sensitivity of the foil strain gages.

Special advantages of the transducer according to the invention are seen in that an adjustment, for example of the creeping or the torsional error, does not cause any variations of the impedance or of the sensitivity of the foil strain gage arrangement. Further, it is advantageous that it is not necessary to accomplish the impedance adjustment by etching the thickness of the foil strain gage, rather, it may be accomplished by simply interrupting the conductor sections. Another very important advantage is seen in that a foil strain gage arrangement according to the invention does not have to be designed separately for each spring prototype. Rather, the present arrangement can be used for different types of springs. This is so because the different characteristics of different types of springs may be taken into account by a respective adjustment of the arrangement according to the invention. Further, according to the invention it is possible to accomplish, so to speak, simultaneously the compensation of the creeping error, of the temperature dependent creeping error, and of the off-center loading error. The output signal may be calibrated by a respective combination of strain sensitive and strain nonsensitive components at a nominal or rated load while maintaining a predetermined total impedance.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 2:
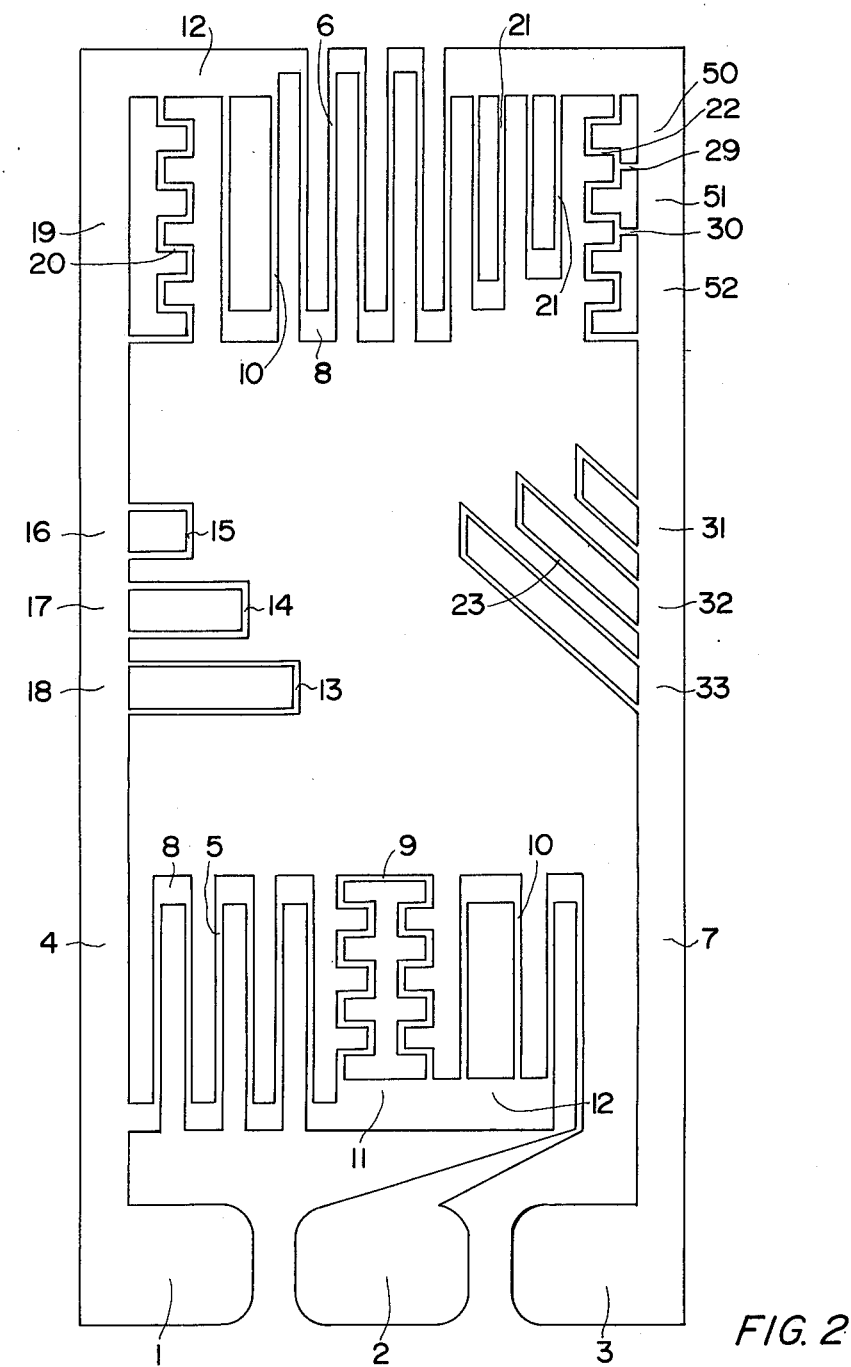
FIG. 2 shows a foil strain gage arrangement comprising further configurations having different mechanical and electrical characteristics, said foil strain gage being applied to a spring.

FIG. 2 illustrates a foil strain gage arrangement according to the invention etched from a foil and comprising a foil strain gage half bridge with three connecting terminals 1, 2, and 3. A conductor section 4 extends first from the terminal 1 to one end of a foil strain gage element 5. The other end of the foil strain gage element 5 is electrically connected to the terminal 2. The conductor section 4 further extends to one end of a second foil strain gage element 6, the other end of which is electrically connected through the conductor section 7 with the terminal 3.

The foil strain elements 5 and 6 are provided in a known manner with areas 8 of increased size where the legs of the strain elements reverse direction, thus, the negative creeping of the foil strain gage is only small. These areas 8 make sure that the absolute value of the negative creeping of the foil strain gage is smaller than the absolute value of the positive creeping of the spring. The foil strain gage element 5 comprises, in addition to the elements functioning as strain gages, further configurations as follows. The configuration 9 has a shape designed for strong creeping. The configuration 10 has a shape designed to provide strain sensitivity. The configuration 9 is short circuited by a low resistance conductor section 11. The configuration 10 is short circuited by a low resistance conductor section 12.

As mentioned above, it is known to design a configuration for strong creeping in such a manner that it has numerous direction reversing zones, whereby these zones are not provided with increased surface areas as for foil strain gages. However, it is an essential part of this invention or discovery that even a configuration without direction reversing zones exhibits a strong creeping in the expansion or strain direction if this configuration meanders in the direction of the strain or expansion. Stated differently, the meandering legs which are the horizontal legs in the configuration 9 in FIG. 2, extend substantially across the strain directions which extends lengthwise or vertically in FIG. 2. This configuration meandering in the strain direction according to the invention has the advantage, as compared to a conventional configuration having numerous direction reversing zones, that it has a substantially smaller impedance while exhibiting the same strong creeping.

Thus, where the same type of creeping is to be compensated, only small resistor changes are required for the combination by simply adding foil strain gage elements to the circuit.

Between the foil strain gage 5 and the foil strain gage 6 there are configurations 13, 14, and 15 having a different length or width as viewed in a direction extending across the strain direction which is the lengthwise or up and down direction in FIG. 2. The configuration 13 is initially short circuited by a conductor section or element 18. The configuration 14 is initially short circuited by a conductor element 17. The configuration 15 is initially short circuited by a conductor element 16. In an electrical sense, this partial section of the foil strain gage arrangement functions as a chain or series connection of pairs of electrical resistors connected in parallel. By interrupting one or several of the conductor elements 16, 17, 18 it is possible to accomplish different impedances in a wide range in this zone. As a practical matter, the width, as viewed horizontally in FIG. 2, of the configurations 13, 14, and 15 is so selected that upon interrupting the respective short circuiting conductor sections 16, 17, or 18 the resistors additionally connected into the circuit arrangements have values which are stepped in a binary fashion. In those instances where small resistor changes are sufficient, it is possible that the short circuited configurations 13, 14, 15 all have the same impedance or resistance. However, it is important that those portions of the foil strain gage arrangement located in expanded zones of the spring are so configured that they practically are not strain sensitive. Furthermore, these parts of the foil strain gage arrangements are applied to zones of the spring which are subject only to a small expansion.

A meandering configuration 20 is short circuited by a conductor section 19 at the beginning of the foil strain gage 6. The meandering configuration 20 is layed out for strong creeping similarly to the configuration 9. However, the configuration 20 comprises fewer meandering legs in the strain direction than the configuration 9. Therefore, the meandering configuration 20 influences the creeping only to a small extent. The configuration 20 is followed by a configuration 10 sensitive to strain and the configuration 10 is short circuited by a conductor section 12. Then follows the strain sensitive portion of the foil strain gage 6. The latter is followed by a configuration 21 also sensitive to strain and basically laid out similarly to the configuration 10. For example, the legs of the configuration 21 may have different lengths in the strain direction. The foil strain gage 6 is terminated, for example, by a further meandering configuration 22 similar to the configuration 20. However, certain points of the configuration 22 are connected through electrical taps 29, 30 to the conductor section 7. The short circuiting conductor sections 50, 51, and 52 of the conductor section 7 may be interrupted so that the corresponding portions of the configuration 22 may be connected into the circuit through the respective taps 29 and 30.

Between the configuration 22 forming the end of the foil strain gage 6 and the terminal 3 there is arranged a further strain sensitive configuration 23 extending at an angle of about 45° relative to the longitudinal extension of the foil strain gages 5 and 6 and thus relative to the direction of the strain. The configuration 23 in the form of foil strain gage sections may also be located in a different position, for example, between the output end of the foil strain gage 5 and the configuration 13. Another possibility for locating the configuration 23 would be between the configurations 15 and 20. Yet another possibility for locating the foil strain gage 23 is to place it outside the half bridge defined by the foil strain gages 5 and 6 rather than within such half bridge. The individual loops of the foil strain gage 23 are respectively connected at the point of return with the conductor section 7 so that short circuiting sections 31, 32, and 33 are provided between the individual loops of the configuration 23.

A foil strain gage arrangement with its configurations as just described is applied to a given spring body by conventional means, for example, the foil strain gage with its configurations may be secured to the spring by an adhesive of the synthetic resin kind. Once the foil strain gage arrangement is properly secured to the spring a predetermined load F in the form of a stepped function is applied to the spring. Then, the creeping is measured over a predetermined length of time to ascertain the creeping characteristic of the transducer or pick-up comprising the spring and the foil strain gage arrangement. Since the foil strain gage arrangement is configured to exhibit a very small negative creeping, the over all creeping of the transducer will be positive. Thus, it is necessary to increase the negative creeping of the foil strain gage arrangement until the absolute values of the positive and negative creeping are equal to each other. Due to the above described configurations of the individual components of the foil strain gage arrangement it is known to what extent the creeping will increase by switching the creeping sensitive configurations into the circuit arrangement. Thus, for example, the low resistance or short circuiting electrical conductor section 11 is first interrupted so that the creeping sensitive configuration 9 is connected into the circuit. If thereafter these two absolute values of the creeping are still not equal to each other, it is possible to provide a fine tuning, so to speak, of the creeping by further interrupting the short circuiting electrical conductor taps 29 and 30. Thus, initially the creeping of the foil strain gage arrangement is adjusted for the respective spring to such an extent that the positive creeping of the spring is compensated by the negative creeping of the foil strain gage arrangement.

After the creeping has been compensated in this manner, the transducer is further tested by applying a defined load in an off-center manner to the transducer so that a torsion load is superimposed on the bending measured by the foil strain gage, whereby an error is caused in the measuring of the bending. Similarly as in connection with the creeping compensation, the off-center loading is compensated by opening individual short circuit conductor sections 31, 32, and 33, whereby portions of the foil strain gage 23 are connected into the current flow path. As mentioned, the foil strain gage 23, or rather the section thereof, extend at an angle of about 45° relative to the foil strain gages 5 and 6. Thus, in a manner known the foil strain gage 23 senses not the bending of the spring, but only its torsion. By superimposing the respective proportion of the torsion signal by interrupting the short circuit electrical conductor sections 31, 32, and 33, onto the signal of the foil strain gage half bridge, it is possible to compensate the falsification of the signal of the foil strain gage half bridge according to the invention. Such a tuning or adjustment of the foil strain gage arrangement makes the transducer or pick-up nonsensitive to off-center load applications.

The impedance of the entire foil strain gage arrangement is changed by switching into the circuit portions of the configurations laid out for strong creeping, as well as portions of the foil strain gage 23. Furthermore, the sensitivity of the arrangement varies due to unavoidable manufacturing tolerances. Thus, subsequent to the above mentioned adjustment steps, the sensitivity of the tranducer or pick-up is measured relative to a predetermined load. Thus, it is ascertained what strain component and what resistance component still have to be switched into the current path of the foil strain gage arrangement. Accordingly, for example, a few of the low resistance conductor sections 12 are interrupted, which prior to such interruptions short circuit the strain sensitive configurations 10.

Since the resistance values of the configurations 13, 14, and 15 which are initially short circuited by the interruptable short circuiting electrical conductor sections 16, 17, and 18, are known, these are interrupted until the calculated resistor proportion is obtained. Thus, the transducer or pick-up comprising the foil strain gage arrangement and the spring is then adjusted or tuned and no creeping can be noted externally anymore. An off-center load application does not influence the measured values and the transducer has a predetermined sensitivity as well as a predetermined impedance.

It is possible to manufacture the spring elements of a transducer with a relatively large precision. Therefore, it is possible, according to the invention to adjust or tune, but one master transducer of a certain transducer type and then interrupt the portions of the low resistance short circuiting electrical sections without any measuring to thereby achieve a certain rough adjustment or tuning. Depending on the required precision, such rough tuning may already be sufficient or a fine adjustment may be made for each individual transducer.

Figure 1:
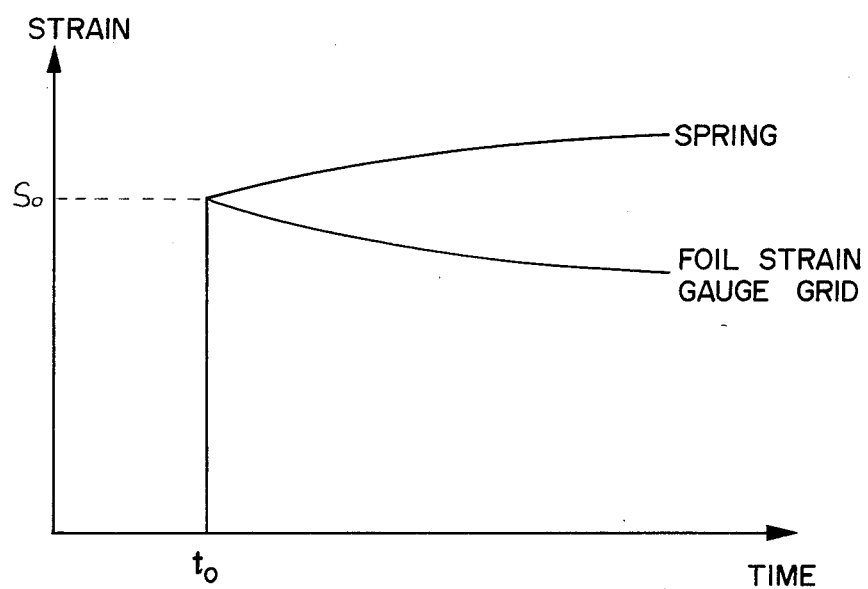
FIG. 1 is a diagram showing strain as a function of time for explaining positive and negative creeping as set forth above.
Figure 3:
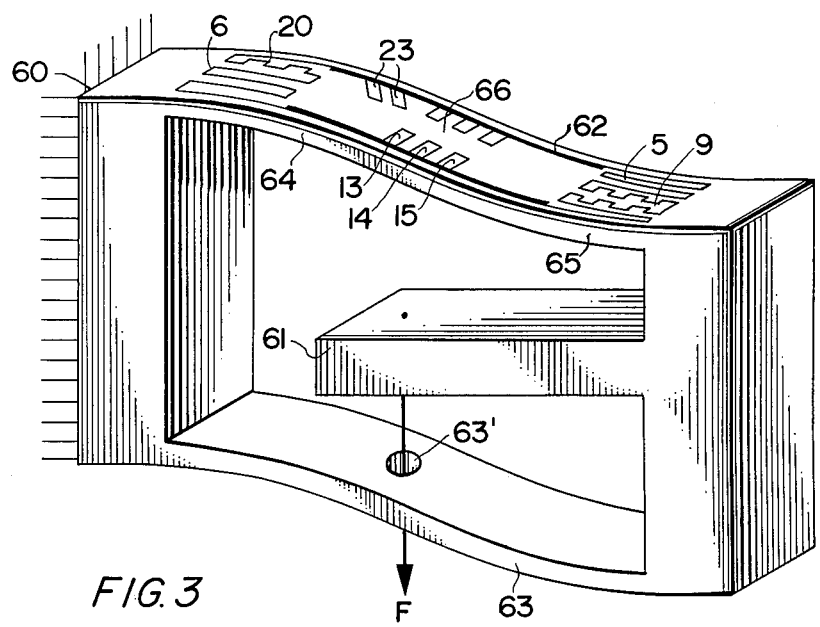
FIG. 3 is a transducer or pick-up provided with a foil strain gage arrangement according to the invention and comprising a double bending spring.

FIG. 3 illustrates an especially advantageous embodiment of the invention comprising a transducer or pick-up with a double bending spring having an upper branch 62 and a lower branch 63 interconnected by end members one of which is secured to a fixed point as shown at 60. The load is applied to a central beam member 61 operatively located between the upper and lower spring members. Foil strain gage arrangements provided with at least some of the same elements as described above are secured to each spring element 62, 63. Thus, at least one configuration 9, 20 is provided for strong creeping and the configurations 13, 14, and 15 are substantially non-sensitive to strain. The foil strain gage arrangement comprises two half bridges applied to the outer faces of the spring element. Thus, the lower strain gage arrangement is not visible because it faces downwardly.

The geometric arrangements of the half bridges is such, that of the foil strain gages 5, 6, and the configurations 9, 20 for strong creeping are located in positions where the maximum expansion or loading of the bending spring takes place, that is, at the ends 64, 65. The configurations 13, 14, 15 which are not sensitive or substantially not sensitive to strain are located in zones of the bending springs in which the spring expansion is about zero, namely in the center 66 of the bending springs. This arrangement according to the invention has the following advantages. Since the configurations which are sensitive to strain or expansion and to creeping, are located in the zones of the maximum expansion, the transducer provides an optimal output signal and the creeping may be compensated by switching into the circuit configurations less sensitive to creeping. Further, the configurations 13, 14, and 15 which are inherently not sensitive to strain are exposed to a very small expansion or strain so that they may be considered as ohmic resistors. Thus, this type of transducer according to the invention permits a null adjustment with a precision approximating about one per thousand.

Yet another advantage is seen in that the falsification of the pick-up signal by torsion resulting from off-center load applications is very small for pick-ups having several bending springs. Accordingly, only a few torsion sensitive configurations 23 are required for any remaining corrections. Thus, a binary stepping of the values of the configurations 23 extending at an angle of 45° to the foil strain gage elements 5, 6 is generally not necessary. It has been found that a linear stepping of the configuration 23 is suitable and even configurations 23 all having the same shape have been found to be satisfactory.

The embodiment shown in FIG. 3 with multiple springs is amenable to an especially exact adjustment. Therefore, a pick-up or transducer shown in FIG. 3 is particularly suitable for applications requiring a high precision.

Although the invention has been described with reference to specific example embodiments, it will be appreciated, that it is intended, to cover all modifications and equivalents within the scope of the appended claims.

What is claimed is:

1. A strain gage transducer, comprising spring means, foil means operatively secured to said spring means, said foil means comprising foil strain gage means including contact terminal means etched into said foil means, said foil strain gage means comprising strain gage elements and a plurality of different conductor configurations also etched into said foil means for operatively interconnecting said strain gage elements by said different conductor configurations, said foil means further comprising interruptable electrically conducting short circuit sections also etched into said foil means and operatively interconnecting said conductor configurations, each of said short circuit sections being arranged for initially short circuiting a respective one of said plurality of different conductor configurations.

2. The transducer of claim 1, further comprising electrical tap means (29, 30) operatively interposed between said short circuit sections (50, 51, 52) and a respective one of said conductor configurations (22), said short circuit sections being interruptable between adjacent tap means.

3. The transducer of claim 2, wherein the values of the mechanical characteristics and the values of the electrical characteristics are such that binary steps of such values are established between adjacent ones of said electrical tap means.

4. The transducer of claim 1 or 2, wherein at least one of said strain gage elements comprises a specially configured component (10, 21) forming part of the respective strain gage element.

5. The transducer of claim 1 or 2, wherein at least one of said conductor configurations is configured to exhibit strong creeping.

6. The transducer of claim 5, wherein said at least one configuration exhibiting strong creeping has a meandering shape extending substantially in the strain direction.

7. The transducer of claim 1, wherein at least two of said conductor configurations have creeping characteristics with different temperature responses.

8. The transducer of claim 1, wherein said conductor configurations comprise members so shaped as to be substantially nonsensitive to strain, said strain nonsensitive members being applied to zones of said spring means which are subject to but little expansion or strain.

9. The transducer of claim 1, comprising at least one further conductor configuration (23) extending at an angle of about 45° relative to at least one of said foil strain gage means.

10. The transducer of claim 1, wherein said spring means comprise double bending springs, said strain gage elements forming two half bridges, each half bridge comprising its respective ones of said conductor configurations and its respective ones of said strain gage elements, said conductor configurations comprising members for strong creeping and further members substantially nonsensitive to strain, said strain gage elements and said members for strong creeping being located substantially at the ends of each bending spring, whereas said further members substantially nonsensitive to strain are located about centrally on the respective spring.

* * * * *